J. R. MOFFITT.
Grain Cleaning Machine.
No. 24,138.
Patented May 24, 1859.
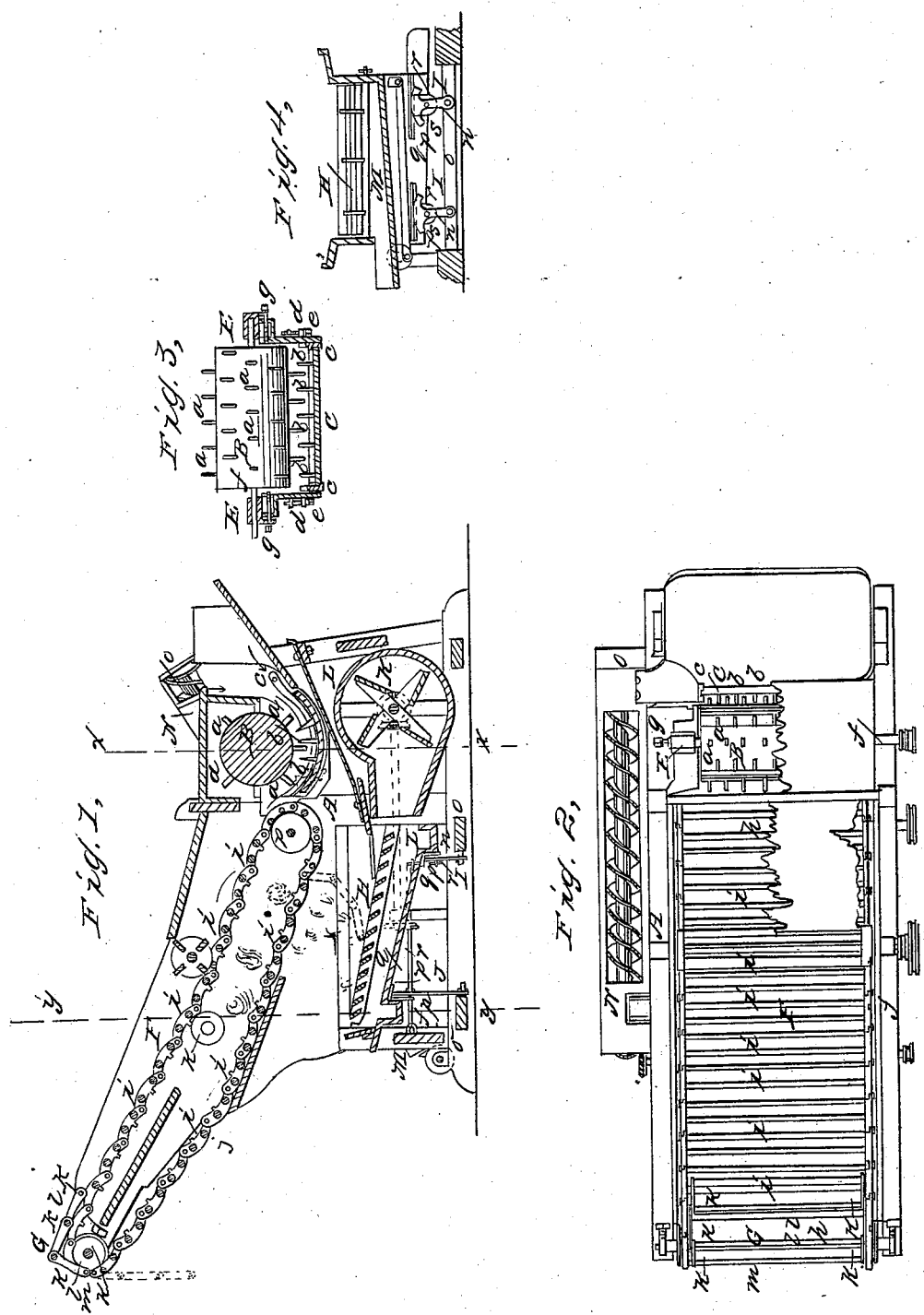

UNITED STATES PATENT OFFICE.

J. R. MOFFITT, OF PIQUA, OHIO.

THRESHING-MACHINE.

Specification of Letters Patent No. 24,138, dated May 24, 1859.

*To all whom it may concern:*

Be it known that I, JOHN R. MOFFITT, of Piqua, in the county of Miami and State of Ohio, have invented a new and useful Improvement in Threshing-Machines; and I do hereby declare the following to be a full and exact description of the same, reference being had to the accompanying drawings, making part of this specification.

The subject of the invention is an arrangement whereby the front portion of the concave of a threshing machine is secured by a permanent hinge (subject only to a slight occasional adjustment to compensate for wear) at a given constant distance from the cylinder, so as to regulate the feed in accordance with the capacity of the machine; while the portion of the concave in which the teeth are fixed, is made susceptible of ready—but positive and unyielding—adjustment, toward and from the cylinder, to suit different kinds and conditions of grain.

In the accompanying drawings Figure 1 is a vertical longitudinal section of a threshing and separating machine embodying my improvements. Fig. 2 is a top view of the same. Fig. 3 is a vertical transverse section of the concave and its accessories at $x$, $x$, Fig. 1. Fig. 4 is a vertical transverse section of the winnowing apparatus at $y$ $y$ Fig. 1.

The frame A, cylinder B, straw carrier F, G, elevator O, and winnowing apparatus H I K, &c., may be of any suitable construction. The shaft $f$, of the cylinder B is journaled in bearings E, which may be adjusted by screws $g$, so as to compensate for any wear of the shaft, and to insure an even and steady motion without end play.

C is the concave, armed at or near its lowest part with teeth $b$, $b$. The said concave consists of segments, fitting in grooved heads $c$, hinged at their front ends to the side plates of the machine, and at their rear ends provided with lugs $d$, projecting externally through the side plates, and there supported by set screws $e$, which engage in fixed lugs $t$, projecting from the side plates, so as to afford immovable bearings at right angles to the play of the concave.

The following may be mentioned as objects of my peculiar manner of mounting the concave and features distinguishing it from other methods of which I have knowledge: It is generally necessary that the front end of the concave should vary but little in distance from the cylinder, in order that grain may pass in from the feed board, at equal speed at all times. Experience proves the most advantageous position for the teeth of the concave to be under the center of the cylinder or nearly so; and the distance of these teeth from the cylinder must be varied, in accordance with the kinds and conditions of grain to be threshed. Thus with some varieties of grain or with certain conditions, as of extreme dryness, too great proximity of the teeth will inevitably result in breaking a portion of the grain, as well as involving a needless expenditure of power, while under other circumstances the grain cannot be effectually threshed without setting the concave teeth nearer to the cylinder or increasing their number. For these reasons, the concave is permanently hinged at the side at which the unthreshed grain enters, while the side near which the teeth are fixed is made adjustable. It is imperatively necessary to the successful operation of threshing machines that the concave should be firmly held in any position at which it may be set. In the absence of positive bearings, "letting down" of the concave is inevitable, and results in imperfect threshing and serious loss of grain. An additional advantage of this arrangement is found in the fact that the mechanism by which the concave is elevated or depressed is the mechanism by which also it is held in position, while the arrangement of the said mechanism is such as to make it conveniently accessible from the outside of the machine.

I prefer the plan here shown of forming the lug $d$ in one piece with the concave head $c$, and the lug $t$, a solid projection from the side plate of the machine, with a suspensary screw bolt $e$, connecting them; but it is evident that some slight modifications may be made without changing the principle or the mechanical effect of the arrangement. Thus for instance:—the bearing by which the bolt $e$ is connected to the exterior of the frame may be simply a metal-faced shoulder in the frame, instead of a projection from the side-plate; and the bolt $e$ may be formed with an L-shaped bend projecting inward through the side plate, and may there be connected directly to the concave head so as to take the place of the lug $d$;—or the bolt $e$, may screw either into its upper or into its lower bearing, so as to dispense with a nut.

It is an object with machines embodying the device above described to be able to fix the concave rigidly in position, with its rear part at such proximity to the cylinder as may be found to most effectually thresh the grain with the least expenditure of power. For this reason it will be seen that springs or other yielding attachments must be detrimental to the effective operation of the machine.

I am aware that it is common to mount the concaves of threshing machines in grooved segment heads, and that concaves have been made capable of adjustment at one side, the other side remaining stationary, and I am also aware that concaves have been adjusted by set screws parallel or nearly so with the line of adjustment; but I claim to have originated a new arrangement for accomplishing the objects sought, and one by which they are more fully and beneficially attained. I therefore do not claim any of the parts separately considered.

I claim as new and of my invention herein—

The described arrangement of fixed bearings $t$, set screws $e$, (in the line of adjustment) and hinged concave heads $c$ $d$; the whole operating together to set and rigidly retain the toothed portion of the concave at any desired proximity to the threshing cylinder; while at the side at which the unthreshed grain enters its distance is substantially unchanged.

In testimony of which I hereunto set my hand.

J. R. MOFFITT.

Witnesses:
R. SLAUSON,
FRANCIS REID.